United States Patent [19]

Chun et al.

[11] 4,448,759
[45] May 15, 1984

[54] METHOD FOR SEPARATING PARTICULATE CALCIUM HYPOCHLORITE AND SODIUM CHLORIDE

[75] Inventors: Duk S. Chun, Uniontown; David A. Stermole, Bedford Heights; Clifford E. Loehr, Norton, all of Ohio

[73] Assignee: PPG Industries, Inc., Pittsburgh, Pa.

[21] Appl. No.: 374,132

[22] Filed: May 3, 1982

[51] Int. Cl.³ .............................................. C01B 11/06
[52] U.S. Cl. .................................... 423/474; 423/499
[58] Field of Search ....................... 423/474, 499, 659; 422/252; 209/158-161; 23/204

[56] References Cited

U.S. PATENT DOCUMENTS

| | | | |
|---|---|---|---|
| 1,937,190 | 11/1933 | Chance ................................. | 209/161 |
| 3,237,767 | 3/1966 | Fowle .................................. | 209/160 |
| 3,251,647 | 5/1966 | Nicolaisen ........................... | 423/474 |
| 3,767,775 | 10/1973 | Tatara et al. ........................ | 423/474 |
| 3,950,499 | 4/1976 | Miyashin et al. .................... | 423/474 |
| 4,258,024 | 3/1981 | Hoffer et al. ....................... | 423/474 |
| 4,328,200 | 5/1982 | Welch .................................. | 423/474 |

Primary Examiner—Gary P. Straub
Attorney, Agent, or Firm—Irwin M. Stein

[57] ABSTRACT

Calcium hypochlorite particles and larger sodium chloride crystals are separated by passing an aqueous slurry containing such particles and crystals into a first classification zone comprising a two-stage substantially vertical elutriator-classifier. A first slurry in which the solid phase is predominantly calcium hypochlorite particles is removed from the upper stage of the first classification zone. A second slurry in which the solid phase is predominantly sodium chloride crystals is removed from the lower stage of the first classification zone and forwarded to a second classification zone comprising a two-stage substantially vertical elutriator-classifier. A slurry in which the solid phase is predominantly calcium hypochlorite particles is removed from the upper stage of the second classification zone and, in one embodiment, combined with overflow from the upper stage of the first classification zone. A slurry in which the solid phase is predominantly sodium chloride crystals is removed from the lower stage of the second classification zone. Elutriation fluid comprising a saturated solution of calcium hypochlorite and sodium chloride is introduced into the lower stages of each of the first and second classification zones.

18 Claims, 1 Drawing Figure

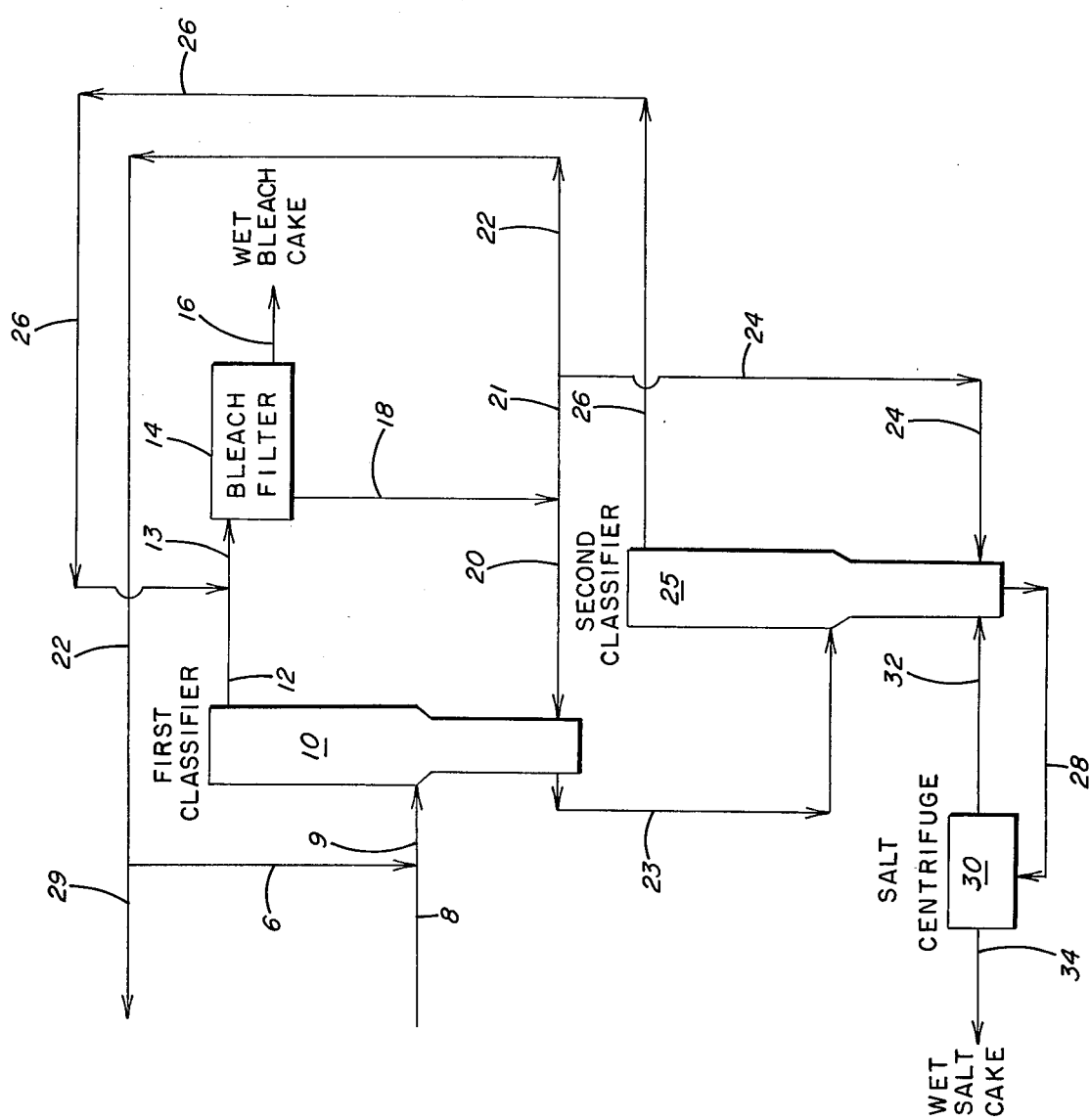

METHOD FOR SEPARATING PARTICULATE CALCIUM HYPOCHLORITE AND SODIUM CHLORIDE

DESCRIPTION OF THE INVENTION

The present invention relates to the manufacture of neutral calcium hypochlorite. Aside from chlorine, calcium hypochlorite enjoys a major portion of the market for available chlorine compounds because it is the cheapest and most stable solid composition known which delivers all of its available chlorine immediately on contact with oxidizable materials. Calcium hypochlorite compositions containing at least 65 percent of available chlorine have been on the market for many years and are used primarily as a commercial bleaching and sanitizing agent, particularly in the disinfection of swimming pool waters.

A variety of processes for manufacturing calcium hypochlorite have been proposed. In some, an aqueous slurry of calcium hypochlorite particles and sodium chloride crystals are simultaneously produced in an aqueous reaction mixture. In order to produce a calcium hypochlorite of high purity and high available chlorine content, it is necessary to effectively separate the calcium hypochlorite particles from the sodium chloride crystals admixed therewith. Otherwise, a calcium hypochlorite product having an available chlorine content less than the desired commercial value, e.g., 65 percent, will be obtained.

Among the methods suggested for separating crystals of sodium chloride from particles of calcium hypochlorite are flotation, decantation, hydrocloning, and ascending flow classification in a cylindrical classifier. See, for example, in U.S. Pat. Nos. 4,258,024 and 3,767,775. The technique of particle size classification by flotation is technically involved and has the added cost of the foam-producing reagent. The techniques of decantation and ascending flow classification with piston flow have the disadvantage of removing more than an insignificant quantity of calcium hypochlorite along with the heavier sodium chloride crystals.

It has now been discovered that an effective separation of calcium hypochlorite particles and larger sodium chloride crystals can be achieved by the use of a series of staged upward-flow substantially vertical elutriator-classifiers. In particular, it has been found that such separation can be achieved by introducing an aqueous slurry of calcium hypochlorite particles and larger sodium chloride crystals into about the midpoint of a first classification zone comprising a staged upward-flow elutriator-classifier. A first slurry in which the solid phase is predominantly calcium hypochlorite particles is removed from the upper portion of the upper stage of the first classification zone and a slurry in which the solid phase is predominantly sodium chloride crystals is removed from the lower portion of the lower stage of the first classification zone.

The sodium chloride-rich slurry removed from the first classification zone is forwarded to about the midpoint of a second classification zone comprising a further staged upward-flow elutriator-classifier. A slurry in which the solid phase is predominantly calcium hypochlorite particles is removed from the upper portion of the upper stage of the second classification zone and, in one embodiment, combined with the overflow effluent from the first classification zone. A slurry in which the solid phase is predominantly sodium chloride is removed from the lower portion of the lower stage of the second classification zone. Elutriating fluid comprising an aqueous solution saturated with calcium hypochlorite and sodium chloride is introduced into the lower stage of each of the first and second classification zones in order to wash descending crystals of sodium chloride of calcium hypochlorite particles associated with such crystals.

In a preferred embodiment, the overflow from the first and second classification zones are combined and forwarded to solid-liquid separating means to produce a wet cake of calcium hypochlorite and entraining bleach mother liquor; and this bleach mother liquor used as elutriating fluid in both the first and second classification zones. Further, the aqueous slurry rich in sodium chloride crystals removed from the lower portion of the second classification zone is forwarded to other liquid-solid separating means to produce a wet salt cake and salt mother liquor, which can be recycled to the second classification zone for use as carrier liquor for removing sodium chloride-rich slurry from the lower portion of the lower stage of that classification zone.

BRIEF DESCRIPTION OF THE DRAWING

The specific features and advantages of the present invention will become more clear from the following detailed description made with reference to the drawing, which is a schematic flow diagram of the process steps of a preferred embodiment of the present invention.

DETAILED DESCRIPTION OF THE INVENTION

Referring to the drawing, there is shown flow lines 8 and 9 for transporting an aqueous slurry of calcium hypochlorite particles and sodium chloride crystals from an upstream stage of a calcium hypochlorite manufacturing process (not shown) wherein such slurry is produced, e.g., a chlorination zone. Typically, flow line 8 contains from about 16 to about 25 weight percent solids, more typically, between about 18 and 20 weight percent solids, the predominant portion of such solids being particulate calcium hypochlorite and sodium chloride crystals.

The particles of calcium hypochlorite found in the aforesaid aqueous slurry are typically agglomerates of smaller calcium hypochlorite crystals. These particles can have a weight mean average particle size of between about 50 and 120 microns, e.g., between about 80 and 100 microns. The weight mean average particle size of the sodium chloride crystals in the aforesaid aqueous slurry can be greater than 150, e.g., greater than 170 microns. The weight mean average particle size of the sodium chloride crystals produced in certain calcium hypochlorite manufacturing process, e.g., the process described in copending U.S. Ser. No. 350,653, filed Feb. 22, 1982, can be between about 280 and 420 microns, e.g., between 350 and 400 microns.

The specific weight mean average particle size of calcium hypochlorite particles and sodium chloride crystals will depend on the particular calcium hypochlorite manufacturing process. Generally, the sodium chloride crystals are significantly larger than the calcium hypochlorite particles and are sufficiently larger so that a separation method which utilizes the difference in size and/or bulk density of the calcium hypochlorite particles and sodium chloride crystals can be used. Such larger sodium chloride crystals are readily separable from the smaller calcium hypochlorite particles by gravity classification, and, as used herein, the term "separable", "readily separable", or like terms are intended to refer to such sodium chloride crystals.

The weight mean average particle size of the larger separable sodium chloride crystals is at least 60, e.g., 80, more typically at least 100, microns larger than the weight mean average particle size of the calcium hypochlorite particles. In a preferred embodiment, the weight mean size differential between the calcium hypochlorite particles and sodium chloride crystals is greater than 200 and more preferably greater than 280 microns. In the calcium hypochlorite manufacturing process described in coassigned U.S. patent application, Ser. No. 350,653, filed Feb. 22, 1982, the aforesaid weight mean size differential ranges between 80 and 370, e.g., between 250 and 320, microns.

In the event that the solids content of the slurry in flow line 8 is too high, or in the event of a turn-down of the calcium hypochlorite manufacturing process, an aqueous solution saturated with calcium hypochlorite and sodium chloride, e.g., bleach mother liquor, can be admixed with flow line 8 by means of flow line 6. The amount of bleach mother liquor so admixed will depend on the solids content desired to be introduced into classification zone 10 and/or the amount of total liquid required to be introduced therein for proper operation of the classifier.

A first slurry in which the solid phase is predominantly calcium hypochlorite particles is removed from the upper portion of the upper stage of first classification zone 10 and forwarded by means of flow lines 12 and 13 to bleach filter 14. In filter 14, slurry containing particulate calcium hypochlorite is separated into a wet cake of calcium hypochlorite and bleach mother liquor. The calcium hypochlorite wet cake is removed from bleach filter 14 by flow line 16 and bleach mother liquor removed by flow line 18.

A second slurry in which the solid phase is predominantly sodium chloride crystals is removed from the lower portion of the lower or bottom stage of first classification zone 10 by means of flow line 23. This second slurry is introduced into about the midpoint of second classification zone 25. A third slurry in which the solid phase is predominantly calcium hypochlorite particles is removed from the upper portion of the upper stage of second classification zone 25 by means of flow line 26. This third slurry which contains a relatively small amount of calcium hypochlorite solids, e.g., from about 1 to about 3 percent, and substantially no sodium chloride crystals is preferably forwarded to bleach filter means 14 for recovery of the calcium hypochloride solids. In a further embodiment, the third slurry is recycled to the first classification zone 10, e.g., by admixing such slurry with the slurry in feed line 8 and thereby replaces all or part of the bleach mother liquor introduced into classification zone 10 by flow line 6—the mother liquor of the third slurry being saturated with calcium hypochlorite and sodium chloride.

A fourth slurry in which the solid phase is predominantly sodium chloride crystals is removed from the lower portion of the lower stage of second classification zone 25 by means of flow line 28 and fowarded to salt separating means, e.g., salt centrifuge 30. There, the salt-containing slurry is separated into a wet salt cake and removed from centrifuge 30 by means of flow line 34. Salt mother liquor from centrifuge 30, which is also saturated with calcium hypochlorite and sodium chloride, is preferably recycled by means of flow line 32 to the bottom of the lower stage of second classification zone 25 to serve as carrier fluid for removing salt slurry from said second classification zone.

Bleach mother liquor removed from bleach filter means 14 is forwarded by means of flow line 18 and 20 to the lower stage of first classification zone 10 as elutriating fluid. A portion of this elutriating fluid may also be carried out with the salt slurry removed by means of flow line 23, thereby also serving as carrier fluid for the salt slurry. The elutriating fluid introduced into this stage can be introduced at any level in the lower stage, but is usually introduced in the lower portion of the lower stage. In the latter embodiment, the elutriating fluid is usually introduced at a level which is above, or below, e.g., from 0.1 to 3 column diameters above or below, or at the same level as the withdrawal point of the second slurry. Similarly, bleach mother liquor is forwarded by means of flow lines 21 and 24 to the lower stage of second classification zone 25 as elutriating fluid. Advantageously, elutriating fluid is introduced at a level above the carrier fluid entry point to avoid short circuiting of elutriating fluid to the fourth slurry; but, as described with regard to the first classification zone, elutriating fluid can be introduced at any level in the lower stage, e.g., at a point above or below, e.g., from 0.1 to 3 column diameters above or below, or at the same level as the withdrawal point of the salt slurry. The remaining bleach mother liquor can be recycled by means of flow lines 22 and 29 to another portion of the calcium hypochlorite manufacturing process.

As the bleach mother liquor (flow line 18), salt mother liquor (flow line 32) and the overflow solids-free liquor from the second classification zone 25 (flow line 26) are saturated with calcium hypochlorite and sodium chloride, various alternative piping arrangements for use of such liquors are contemplated. For example, bleach mother liquor introduced into the lower stage of the second classification zone (flow line 24) can be used as carrier liquor for the sodium chloride slurry (in place of the salt mother liquor) and the salt mother liquor (flow line 32) used as elutriating fluid (in place of bleach mother liquor) in the second classification zone 25. In a further embodiment, the salt mother liquor and bleach mother liquor streams entering the second classification zone 25, i.e., flow lines 32 and 24, can be combined and the combined mother liquors introduced into the lower stage of the second classification zone. The amount of combined mother liquor so introduced used as elutriating fluid within the classifier can be regulated by controlling the flow of salt slurry removed from the bottom of the classifier.

In another embodiment, salt mother liquor (flow line 32) can be used to replace a portion or all of the bleach mother liquor used as elutriating fluid (flow line 20) in the first classification zone 10. In that event, more bleach mother liquor is introduced into the second classification zone 25 through flow line 24. Thus, the volume of elutriating/carrier liquor charged to the first and second classification zones by means of flow lines 20, 24 and 32 will be balanced to insure proper operation of the elutriator-classifiers.

In a further embodiment, salt mother liquor (flow line 32) can be used to replace all or a part of the bleach mother liquor (flow line 6) admixed with the feed 8 to the first classification zone 10. In that event, more bleach mother liquor is directed to the second classification zone through flow line 24, i.e., the volume of liquor handled by flow lines 32, 24 and 6 are balanced.

In a still further embodiment, the overflow from the second classifier (flow line 26) can be used to replace all or a part (depending on relative flow rates) of the bleach mother liquor (flow line 6) admixed with the feed 8 to the first classification zone. The small amount of calcium hypochlorite solids in flow line 26 are returned to the primary elutriator-classifier and are eventually forwarded to bleach filter 14 instead of being recycled directly to said filter. The aforesaid overflow (flow line 26) can also be recycled to the lower stage of the first classification zone as elutriating fluid.

The elutriator classifiers described herein are gravity classifiers of the up-flow type, i.e., classifiers operating by an elutriation/sedimentation technique. In such classifiers, the calcium hypochlorite particles are suspended in mother liquor present in the upper portion of the classifier while a bed of larger, heavier sodium chloride crystals is maintained in the lower portion of the classifier. Each of the classifiers are staged, i.e., contain two or more stages. The diameter of the respective stages increase in ascending order, i.e., in the direction of calcium hypochlorite slurry flow. While classifiers having two stages are shown in the drawing, classifiers having more than two stages, e.g., three or four, are contemplated.

Each of the two stage classifiers shown in the drawing are substantially vertical, essentially cylindrical columns in which the diameter of the upper stage is larger than the diameter of the bottom stage. The length to diameter (L/D) ratio of the upper stage is at least 2:1 while the L/D ratio of the lower stage is at least 5:1. The L/D ratio of the upper stages can range from 2:1–15:1 while the L/D ratio of the bottom stage can vary from about 5:1 to about 40:1. For purposes of piston or plug flow, L/D ratios of at least 10:1 and preferably at least 12:1 are recommended. The height of the upper stage is typically larger than the height of the lower stage but the stages can be of equal height. The height of each stage is measured by the height of the straight cylindrical portion of each stage without taking into account the necked down portion of the classifier which connects the upper and lower stages.

Each of the classifiers contains an agitator in the upper stage. The agitator contains at least one and preferably at least three to six blades at various levels in the upper stage. The agitators are operated at relatively slow speeds, e.g., 1 to 20 rpm, in order to prevent channeling of the slurry flowing upwardly through the upper stage and avoid breaking of the particulate solids therein.

The upflow fluid velocity within the classifiers will depend on the weight mean average size of the sodium chloride crystals charged thereto. The upflow velocity should be such that at least 85 percent of the suspended calcium hypochlorite particles are entrained and carried out as overflow effluent while the heavier and larger salt crystals are allowed to settle by gravity into the lower stage. The larger the size of the salt crystals, the higher the velocity that can be used. For example, when the weight mean average salt size is in the range of from 180–250 microns, an upward fluid velocity of about 0.06 centimeters/second is suitable. When the weight mean average particle size of the salt is greater than 250 microns, the upward fluid velocity can be in the range of 0.1–0.4 centimeters/second. The elutriator-classifiers are designed and operated to provide constant upflow velocities in the above range.

The amount of elutriating fluid introduced into the elutriator-classifier is that amount which is sufficient to separate from the counter-currently descending larger sodium chloride crystals the smaller calcium hypochlorite particles associated therewith and wash upwardly such separated calcium hypochlorite particles. The elutriating fluid maintains the calcium hypochlorite particles in suspension in the upper stage(s) of the classifier until such particles are removed with the overflow therefrom. The rate of upward flow of the elutriating fluid is less than the rate which exerts a force that will maintain the larger downwardly flowing sodium chloride crystals in suspension, thereby impeding their descent, or carry upwardly significant amounts of such crystals. The upflow velocity of elutriating fluid required to maintain the aforedescribed balance and effectuate the separation of calcium hypochlorite particles from sodium chloride crystals can vary and is a function of the average particle size of the aforesaid particles and crystals. The required velocity also in part determines the volume of elutriating fluid used. The upflow velocity can be determined by the application of Stoke's Law.

The design of the first classification zone should be such that at least 85 and preferably at least 90 percent of the calcium hypochlorite particles introduced therein are removed with the first slurry. This slurry will also contain a small amount of the very small sodium chloride crystals. Thus, this first slurry will contain less than about 5.0, e.g., less than 2.5 weight percent of solid sodium chloride crystals. The design of the second classification zone should be such that little, i.e., less than 0.5 weight percent, or no solid calcium hypochlorite is removed with the underflow therefrom, i.e., the fourth slurry. The specific design of the first and second elutriator-classifiers will depend on the aqueous slurry feed rate, the absolute size of the average calcium hypochlorite particles and sodium chloride crystals and the size differential between said particles and crystals; however, such classifiers can be designed and constructed utilizing well-known engineering principles.

The upward fluid velocity in the upper and lower stages of the elutriator-classifiers can be about the same; however, due to its smaller diameter, the velocity in the bottom stage often is slightly higher. The upward fluid velocity can be regulated by the amount of elutriating fluid introduced into the lower portion of the lower stage of the classifiers. The elutriating fluid washes the settling sodium chloride crystals of adhering calcium hypocholorite and also washes upwardly calcium hypochlorite particles that may be drawn downwardly into the lower stage of the elutriator-classifier from the feed point.

The slurry feeds to the elutriator-classifiers are introduced therein at about the midpoint of the classifiers and preferably at the bottom of the upper stage, i.e., at the top of the transition section between the upper and lower stages of the classifier. The feed is distributed within the classifier evenly by means of a nozzle which distributes the aqueous slurry in all directions within the column. Use of such nozzle avoids initial preferential directional flow of the aqueous slurry feed within the classifier.

Solids content of the overflow from the upper stage of the first elutriator-classifier will range between about 8 and about 12 weight percent, e.g., about 10 weight percent. Solids content of the salt slurry removed from the lower stage of said classifier and introduced as feed to the second elutriator-classifier will be between about 5 and 20, e.g., 17-18 weight percent. Solids content of the overflow from the top stage of the second elutriator-classifier will be between about 1 and 2, e.g., about 1.5 weight percent; and the solids content of the salt slurry removed from the lower stage of said second classifier will be between about 13 and 17, e.g., 15 weight percent.

While bleach filter liquor is shown as the elutriating fluid in the drawing, any other suitable fluid from the manufacturing process, i.e., fluid which is substantially saturated in calcium hypochlorite and sodium chloride, can be used (as heretofore described) as the elutriating fluid. Such solutions may be available from other portions of the manufacturing process; however, bleach filter mother liquor or salt mother liquor is most convenient and is, therefore, preferred.

Similarly, although filter means and centrifuge means are indicated in the drawing as the separating means used to separate solid calcium hypochlorite and solid sodium chloride respectively from their mother liquors, any solid-liquid separating means suitable for the materials handled can be used. Exemplification of such separating means include centrifuges, plate and frame filters, high pressure expression equipment, such as a tube filter press, piston filter press or membrane filter, or other analogous solid-liquid separating means.

Calcium hypochlorite solids (wet bleach cake) separated in accordance with the present process have been found to contain less than 1 weight percent solid salt. Similarly, sodium chloride solids (wet salt cake) recovered utilizing the present process has been found to contain less than one weight percent solid calcium hypochlorite.

The present invention is more particularly described in the following Example which is intended as illustrative only since numerous modifications and variations therein will be apparent to those skilled in the art. In the Example, all percentages are by weight unless noted otherwise. Flow rates and other values are average values reflecting normal fluctuation in a continuous process.

EXAMPLE 350 grams per minute (g/min) of an aqueous slurry feed stream containing about 10 weight percent calcium hypochlorite particles and about 7 weight percent sodium chloride crystals were charged to a classification zone comprising dual two-stage upward flow cylindrical elutriator-classifiers. The weight mean average particle size of the calcium hypochlorite particles and sodium chloride crystals were 90 and 400 microns respectively. The diameters of the upper and lower stages of the primary elutriator-classifier (first classification zone) were 2.3 and 0.74 inches (5.8 and 1.9 cm.) respectively. The height of both the upper and lower stages was 1.5 feet (46 cm.). The aqueous feed slurry was introduced into the primary classifier at about its midpoint.

190 grams per minute of elutriating fluid comprising an aqueous solution saturated with calcium hypochlorite and sodium chloride (bleach mother liquor) was introduced into the bottom portion of the lower stage of the primary classifier. The upward fluid velocities within the lower and upper stages of the primary classifier were calculated to be 0.24 and 0.18 centimeters per second respectively.

390 grams per minute of an aqueous slurry containing about 8.5 weight percent solids, 94 percent of which solids were calcium hypochlorite, were withdrawn from the upper portion of the upper stage of the primary classifier and forwarded to a bleach filter. Simultaneously, 150 g/min of an aqueous slurry containing about 16 weight percent solids, 90 percent of which solids were sodium chloride crystals, were removed from the bottom of the lower stage of the primary classifier and introduced into the secondary elutriator-classifier (second classification zone) at about its midpoint.

The diameters of the upper and lower stages of the secondary classifier were 1.5 and 0.55 inches (3.8 and 1.4 cm.) respectively. The height of both the upper and lower stages of the secondary classifier was 1.5 feet (46 cm.) respectively. 60 g/min of bleach mother liquor was introduced as elutriating fluid into the bottom portion of the lower stage of the secondary classifier. Simultaneously about 120 g/min of salt mother liquor was introduced as carrier liquor into the bottom portion of the lower stage of the secondary classifier. The upward fluid velocities in the lower and upper stages of the secondary classifier were calculated to be 0.36 and 0.21 centimeters per second respectively. 150 g/min of aqueous salt slurry containing about 14 weight percent solids was also removed from the bottom of the lower stage of the secondary classifier and introduced into a centrifuge where the salt crystals and salt mother liquor were separated. Salt mother liquor in the amount described above, was recycled as carrier liquor.

180 grams per minute of an aqueous slurry containing about 1.1 weight percent calcium hypochlorite solids and 0.3 weight percent sodium chloride solids was removed from the upper portion of the upper stage of the secondary classifier and forwarded to the aforesaid bleach filter. Bleach mother liquor obtained from the filter was recycled to the primary and secondary classifiers at the aforedescribed rates.

The aforesaid process was conducted for 244.5 hours. The wet bleach cake was found to contain about 7.1 weight percent sodium chloride. 0.7 weight percent of the wet bleach cake was solid sodium chloride. The wet salt cake was found to contain about 1.2 weight percent calcium hypochlorite. About 0.6 weight percent of the wet salt cake was solid calcium hypochlorite.

Although the present process has been described with reference to specific details of certain embodiments thereof, it is not intended that such detail should be regarded as limitations upon the scope of the invention except as and to the extent that they are included in the accompanying claims.

What is claimed is:

1. In the process of producing calcium hypochlorite wherein an aqueous slurry of calcium hypochlorite particles and larger separable sodium chloride crystals is produced and wherein the particles of calcium hypochlorite and crystals of sodium chloride are separated in a classification zone, the improvement which comprises:
   (a) introducing aqueous slurry containing such calcium hypochlorite particles and larger sodium chloride crystals into a staged upward flow primary elutriator-classifier at about the midpoint of such classifier,
   (b) introducing elutriating fluid comprising an aqueous solution substantially saturated with calcium hypochlorite and sodium chloride into the lowermost stage of said primary classifier, (c) removing a first slurry in which the solid phase is predominantly calcium hypochlorite particles from the uppermost stage of said primary classifier, (d) separating said first slurry into a wet cake of calcium hypochlorite solids and bleach mother liquor, (e) removing from the lowermost stage of said primary classifier a second slurry in which the solid phase is predominantly sodium chloride crystals, and introducing second slurry into a staged upward flow secondary elutriator classifier at about the midpoint of such secondary classifier, (f) introducing elutriating fluid comprising an aqueous solution substantially saturated with calcium hypochlorite and sodium chloride into the lowermost stage of said secondary classifier, (g) removing from the uppermost stage of said secondary classifier a third slurry in which the solid phase is predominantly calcium hypochlorite particles, and (h) removing from the lowermost stage of said secondary classifier a fourth slurry in which the solid phase is predominantly sodium chloride crystals, the diameter of the stages of said primary and secondary elutriator-classifiers increasing in ascending order, and the upward fluid velocity in the lowermost stages being higher than the upward fluid velocity in the uppermost stages.

2. The process of claim 1 wherein bleach mother liquor from step (d) is used as elutriating fluid in steps (b) and (f).

3. The process of claims 1 or 2 wherein the third slurry of step (g) is combined with the first slurry of step (c).

4. The process of claims 1 or 2 wherein the fourth slurry of step (h) is separated into a wet cake of sodium chloride solids and salt mother liquor.

5. The process of claim 1 wherein the primary and secondary elutriator-classifiers each have two stages, and the L/D ratio of the upper stages ranges from 2:1 to 15:1, and the L/D ratio of the bottom stages ranges from 5:1 to 40:1.

6. The process of claim 5 wherein the upper stage of each of said primary and secondary classifiers contain agitators.

7. The process of claim 5 wherein the fourth slurry of step (h) is separated into a wet cake of sodium choloride solids and salt mother liquor, and salt mother liquor recycled as elutriating fluid to the lower stage of the primary classifier.

8. In the process of producing calcium hypochlorite wherein an aqueous slurry of calcium hypochlorite particles and larger separable sodium chloride crystals is produced and wherein the particles of calcium hypochlorite and crystals of sodium chloride are separated in a classification zone, the improvement which comprises:

(a) introducing aqueous slurry containing such calcium hypochlorite particles and larger sodium chloride crystals into a primary two-stage upward flow elutriator-classifier at about its midpoint, the L/D ratio of the upper stage ranging from about 2:1 to about 15:1, and the L/D ratio of the bottom stage ranging from about 5:1 to about 40:1, the diameter of said upper stage being larger than said bottom stage and the upward fluid velocity in said bottom stage being higher than the upward fluid velocity in said upper stage, (b) introducing as elutriating fluid bleach mother liquor obtained from step (d) into the lower stage of said primary classifier, (c) removing from the upper stage of said primary classifier a first slurry in which the solid phase is predominantly calcium hypochlorite particles, (d) separating first slurry from step (c) into a wet cake of calcium hypochlorite solids and bleach mother liquor, (e) removing from the lower stage of said primary classifier second slurry in which the solid phase is predominantly sodium chloride crystals, and introducing second slurry into a secondary two-stage upward flow elutriator-classifier at about its midpoint, the L/D ratio of the upper stage ranging from about 2:1, and the L/D ratio of the bottom stage ranging from about 5:1 to about 40:1, the diameter of said upper stage being larger than said bottom stage and the upward fluid velocity in said bottom stage being higher than the upward fluid velocity in said upper stage, (f) introducing as elutriating fluid bleach mother liquor obtained from step (d) into the lower stage of said secondary classifier, (g) removing from the upper stage of said secondary classifier a third slurry in which the solid phase is predominantly calcium hypoclorite particles, and (h) removing from the lower stage of said secondary classifier a fourth slurry in which the solid phase is predominantly sodium chloride crystals.

9. The process of claim 8 wherein the third slurry of step (g) is forwarded to step (d).

10. In the process of producing calcium hypochlorite wherein an aqueous slurry of calcium hypochlorite particles and larger separable sodium chloride crystals is produced and wherein the particles of calcium hypochlorite and crystals of sodium chloride are separated in a classification zone, the improvement which comprises:

(a) introducing aqueous slurry containing such calcium hypochlorite particles and larger sodium chloride crystals into a staged upward flow primary elutriator-classifier at about the midpoint of such classifier, (b) introducing elutriating fluid comprising an aqueous solution substantially saturated with calcium hypochlorite and sodium chloride into the lowermost stage of said primary classifier, (c) removing a first slurry in which the solid phase is predominantly calcium hypochlorite particles from the uppermost stage of said primary classifier, (d) separating said first slurry into a wet cake of calcium hypochlorite solids and bleach mother liquor, (e) removing from the lowermost stage of said primary classifier a second slurry in which the solid phase is predominantly sodium chloride crystals, and introducing second slurry into a staged upward flow secondary elutriator-classifier at about the midpoint of such secondary classifier, (f) introducing elutriator fluid comprising an aqueous solution substantially saturated with calcium hypochlorite and sodium chloride into the lowermost stage of said secondary classifier, (g) removing from the uppermost stage of said secondary classifier a third slurry in which the solid phase is predominantly calcium hypochlorite particles, (h) removing from the lowermost stage of said secondary classifier a fourth slurry in which the solid phase is predominantly sodium chloride crystals, (i) separating said fourth slurry into a wet cake of sodium chloride solids and salt mother liquor, and (j) recycling salt mother liquor to the lowermost stage of the secondary classifier and removing salt mother liquor from said stage with said fourth slurry, the diameter of the stages of said primary and secondary elutriator-classifiers increasing in ascending order.

11. The process of claim 10 wherein bleach mother liquor from step (d) is used as elutriating fluid in steps (b) and (f).

12. In the process of producing calcium hypochlorite wherein an aqueous slurry of calcium hypochlorite particles and larger separable sodium chloride crystals is produced and wherein the particles of calcium hypochlorite and crystals of sodium chloride are separated in a classification zone, the improvement which comprises:

(a) introducing aqueous slurry containing such calcium hypochlorite particles and larger sodium chloride crystals into a staged upward flow primary elutriator-classifier at about the midpoint of such classifier, (b) introducing elutriating fluid comprising an aqueous solution substantially saturated with calcium hypochlorite and sodium chloride into the lowermost stage of said primary classifier, (c) removing a first slurry in which the solid phase is predominantly calcium hypochlorite particles from the uppermost stage of said primary classifier, (d) separating said first slurry into a wet cake of calcium hypochlorite solids and bleach mother liquor, (e) removing from the lowermost stage of said primary classifier a second slurry in which the solid phase is predominantly sodium chloride crystals, and introducing second slurry into a staged upward flow secondary elutriator-classifier at about the midpoint of such secondary classifier, (f) introducing elutriator fluid comprising an aqueous solution substantially saturated with calcium hypochlorite and sodium chloride into the lowermost stage of said secondary classifier, (g) removing from the uppermost stage of said secondary classifier a third slurry in which the solid phase is predominantly calcium hypochlorite particles, (h) removing from the lowermost stage of said secondary classifier a fourth slurry in which the solid phase is predominantly sodium chloride crystals, (i) introducing bleach mother liquor from step (d) into the lower stage of the secondary classifier as carrier fluid for removing said fourth slurry from said classifier, and (j) said fourth slurry of step (h) is separated into a wet cake of sodium chloride solids and salt mother liquor, and salt mother liquor is recycled to the lower stage of the secondary classifier as elutriating fluid, said primary and secondary elutriator-classifiers each having two stages, the L/D ratio of the upper stages ranging from 2:1 to 15:1 and the L/D ratio of the bottom stages ranging from 5:1 to 40:1, the diameter of the upper stages being larger than the lower stages.

13. The process of claim 12 wherein bleach mother liquor from step (d) and the recycled salt mother liquor are combined and introduced into the lower stage of the secondary classifier.

14. In the process of producing calcium hypochlorite wherein an aqueous slurry of calcium hypochlorite particles and larger separable sodium chloride crystals is produced and wherein the particles of calcium hypochlorite and crystals of sodium chloride are separated in a classification zone, the improvement which comprises:

(a) introducing aqueous slurry containing such calcium hypochlorite particles and larger sodium chloride crystals into a staged upward flow primary elutriator-classifier at about the midpoint of such classifier, (b) introducing elutriating fluid comprising an aqueous solution substantially saturated with calcium hypochlorite and sodium chloride into the lowermost stage of said primary classifier, (c) removing a first slurry in which the solid phase is predominantly calcium hypochlorite particles from the uppermost stage of said primary classifier, (d) separating said first slurry into a wet cake of calcium hypochlorite solids and bleach mother liquor, (e) removing from the lowermost stage of said primary classifier a second slurry in which the solid phase is predominantly sodium chloride crystals, and introducing second slurry into a staged upward flow secondary elutriator-classifier at about the midpoint of such secondary classifier, (f) introducing elutriator fluid comprising an aqueous solution substantially saturated with calcium hypochlorite and sodium chloride into the lowermost stage of said secondary classifier, (g) removing from the uppermost stage of said secondary classifier a third slurry in which the solid phase is predominantly calcium hypochlorite particles, (h) removing from the lowermost stage of said secondary classifier a fourth slurry in which the solid phase is predominantly sodium chloride crystals, and (i) separating said fourth slurry into a wet cake of sodium chloride solids and salt mother liquor, and salt mother liquor is recycled to about the midpoint of the primary classifier, said primary and secondary elutriator-classifiers each having two stages, the L/D ratio of the upper stages ranging from 2:1 to 15:1 and the L/D ratio of the bottom stages ranging from 5:1 to 40:1, the diameter of the upper stages being larger than the lower stages.

15. In the process of producing calcium hypochlorite wherein an aqueous slurry of calcium hypochlorite particles and larger separable sodium chloride crystals is produced and wherein the particles of calcium hypochlorite and crystals of sodium chloride are separated in a classification zone, the improvement which comprises:

(a) introducing aqueous slurry containing such calcium hypochlorite particles and larger sodium chloride crystals into a staged upward flow primary elutriator-classifier at about the midpoint of such classifier, (b) introducing elutriating fluid comprising an aqueous solution substantially saturated with calcium hypochlorite and sodium chloride into the lowermost stage of said primary classifier, (c) removing a first slurry in which the solid phase is predominantly calcium hypochlorite particles from the uppermost stage of said primary classifier, (d) separating said first slurry into a wet cake of calcium hypochlorite solids and bleach mother liquor, (e) removing from the lowermost stage of said primary classifier a second slurry in which the solid phase is predominantly sodium chloride crystals, and introducing second slurry into a staged upward flow secondary elutriator-classifier at about the midpoint of such secondary classifier, (f) introducing elutriator fluid comprising an aqueous solution substantially saturated with calcium hypochlorite and sodium chloride into the lowermost stage of said secondary classifier, (g) removing from the uppermost stage of said secondary classifier a third slurry in which the solid phase is predominantly calcium hypochlorite particles, (h) removing from the lowermost stage of said secondary classifier a fourth slurry in which the solid phase is predominantly sodium chloride crystals, and (i) recycling third slurry of step (g) to about the midpoint of the primary classifier, said primary and secondary elutriator-classifiers each having two stages, the L/D ratio of the upper stages ranging from 2:1 to 15:1 and the L/D ratio of the bottom stages ranging from 5:1 to 40:1, the diameter of the upper stages being larger than the lower stages.

16. In the process of producing calcium hypochlorite wherein an aqueous slurry of calcium hypochlorite particles and larger separable sodium chloride crystals is produced and wherein the particles of calcium hypochlorite and crystals of sodium chloride are separated in a classification zone, the improvement which comprises:

(a) introducing aqueous slurry containing such calcium hypochlorite particles and larger sodium chloride crystals into a primary two-stage upward flow elutriator-classifier at about its midpoint, the L/D ratio of the upper stage ranging from about 2:1 to about 15:1, and the L/D ratio of the bottom stage ranging from about 5:1 to about 40:1, (b) introducing an elutriating fluid bleach mother liquor obtained from step (d) into the lower stage of said primary classifier, (c) removing from the upper stage of said primary classifier a first slurry in which the solid phase is predominantly calcium hypochlorite particles, (d) separating first slurry from step (c) into a wet cake of calcium hypochlorite solids and bleach mother liquor, (e) removing from the lower stage of said primary classifier second slurry in which the solid phase is predominantly sodium chloride crystals, and introducing second slurry into a secondary two-stage upward flow elutriator-classifier at about its midpoint, the L/D ratio of the upper stage ranging from about 2:1 to about 15:1, and the L/D ratio of the bottom stage ranging from about 5:1 to about 40:1, (f) introducing as elutriating fluid bleach mother liquor obtained from step (d) into the lower stage of said secondary classifier, (g) removing from the upper stage of said secondary classifier a third slurry in which the solid phase is predominantly calcium hypochlorite particles, (h) removing from the lower stage of said secondary classifier a fourth slurry in which the solid phase is predominantly sodium chloride crystals, and (i) separating said fourth slurry into a wet cake of sodium chloride solids and salt mother liquor, and salt mother liquor is recycled to the lower stage of the secondary classifier, the diameter of the upper stages of said primary and secondary elutriator-classifiers being larger than the bottom stages.

17. The process of claim 16 wherein the third slurry of step (g) is forwarded to step (d).

18. In the process of producing calcium hypochlorite wherein an aqueous slurry of calcium hypochlorite particles and larger separable sodium chloride crystals is produced and wherein the particles of calcium hypochlorite and crystals of sodium chloride are separated in a classification zone, the improvement which comprises:

(a) introducing aqueous slurry containing such calcium hypochlorite particles and larger sodium chloride crystals into a staged upward flow primary elutriator-classifier at about the midpoint of such classifier, (b) introducing elutriating fluid comprising an aqueous solution substantially saturated with calcium hypochlorite and sodium chloride into the lowermost stage of said primary classifier, (c) removing a first slurry in which the solid phase is predominantly calcium hypochlorite particles from the uppermost stage of said primary classifier, (d) separating said first slurry into a wet cake of calcium hypochlorite solids and bleach mother liquor, (e) removing from the lowermost stage of said primary classifier a second slurry in which the solid phase is predominantly sodium chloride crystals, and introducing second slurry into a staged upward flow secondary elutriator-classifier at about the midpoint of such secondary classifier, (f) introducing elutriator fluid comprising an aqueous solution substantially saturated with calcium hypochlorite and sodium chloride into the lowermost stage of said secondary classifier, (g) removing from the uppermost stage of said secondary classifier a third slurry in which the solid phase is predominantly calcium hypochlorite particles, (h) removing from the lowermost stage of said secondary classifier a fourth slurry in which the solid phase is predominantly sodium chloride crystals, and (i) recycling third slurry of step (g) to the lower stage of the primary classifier, said primary and secondary elutriator-classifiers each having two stages, the L/D ratio of the upper stages ranging from 2:1 to 15:1 and the L/D ratio of the bottom stages ranging from 5:1 to 40:1, the diameter of the upper stages being larger than the lower stages.

* * * * *